United States Patent [19]
Suzuki et al.

[11] 3,713,737
[45] Jan. 30, 1973

[54] READER-PRINTER FOR ELECTROGRAPHS

[75] Inventors: Hidenori Suzuki, Toyohashi; Isao Iizaka, Toyokawa; Yoshihiro Horie, Toyokawa; Katsumi Maeda, Toyokawa; Shotaro Inagaki, Okazaki, all of Japan

[73] Assignee: Minolta Camera Kabushiki Kaisha, Minamiku, Osaka, Japan

[22] Filed: Nov. 12, 1970

[21] Appl. No.: 88,762

[30] Foreign Application Priority Data

Nov. 15, 1969 Japan..........................44/108545
Nov. 19, 1969 Japan..........................44/110024
Nov. 19, 1969 Japan..........................44/110025

[52] U.S. Cl...................................355/45, 355/45
[51] Int. Cl.............................................G03b 27/32
[58] Field of Search ....355/5, 55, 57, 60, 45; 353/25, 353/26, 27, 63, 64

[56] References Cited

UNITED STATES PATENTS

3,511,564   5/1970   Gawin et al. .............................355/5
2,552,238   5/1951   Turner et al. ...........................353/64
3,475,091  10/1969   Smitzer et al. .........................353/75
2,979,020   4/1961   Reuter et al. ............................355/5

Primary Examiner—John M. Horan
Attorney—Stanley Wolder

[57] ABSTRACT

The machine includes in its lower portion a paper feed assembly, an exposure station, a developing device and a dryer. Disposed above these are a frame for inserting a microfilm, a light source, interchangeable lenses, an optical system for projecting images of the original to a reader section and another optical system for projecting the images of the original on the exposure station. The interchangeable lenses comprise a group of at least five lenses having varying magnifications, and the selection of the lens and focusing can be performed from the outside of the machine. The paper feed assembly when taken out of the machine can be handled in one step for supply of the sensitive paper or for change of a different size of paper. The respective mechanisms are controlled by electric control circuits including a resetting circuit.

5 Claims, 10 Drawing Figures

READER-PRINTER FOR ELECTROGRAPHS

BACKGROUND OF THE INVENTION

The present invention relates to an apparatus for projecting original images on microfilm, for instance, of microfiche or roll film type on a reader section and further for projecting the images on charged sensitive paper to obtain satisfactory printed images by electrostatic development.

With machines of such type serving as reader and printer, there is a need to change the light source and lens depending upon the size of the images on microfilm, clearness of the images and the size of sensitive paper for printing. However, machines heretofore known were equipped with only one or two lenses and there was a limitation on the size of the sensitive paper used on the machines. Although suitable for the production of a number of copies from the same original, conventional machines found limited applications with respect to originals of different sizes.

On the other hand, in the case where several different lenses are to be incorporated in a reader-printer, the lenses have to be interchanged easily by an operating member externally provided on the machine and focusing has to be performed also from outside the machine, since the reader-printer has a structure in which the image projecting lens is disposed in the interior of the machine unlike in usual cameras.

It is further required that the paper feed means disposed in the machine be capable of feeding sensitive paper one sheet after another to copying section in response to a predetermined signal or in automatic operation and that the feed means be adapted to be manually released from operating position when a signal is produced to indicate that a pile of paper has been consumed so that supply of paper can be readily made. Since the paper feed means must be compact and adapted for high speed operation, an attempt has been made to disposed a pile of sensitive paper in a small space within the interior of the machine. In such case, only a limited space is available for the operation of feed means and, consequently, there arises a necessity to provide a structure wherein the paper feed means including the container of the paper can be taken out of the machine as a unit for the supply of paper.

SUMMARY OF THE INVENTION

An object of the present invention is to provide a reader-printer for electrographs which is equipped with at least five lenses having different magnifications so that several kinds of microfilms and sensitive papers of different sizes can be used.

Another object of the present invention is to provide a reader-printer for electrographs including at least five interchangeable lenses as described in which the lenses are adapted to be interchanged with ease and focusing of the lens selected can be readily achieved by only one operating member provided externally of the machine.

Still another object of the present invention is to provide paper feed means which is capable of performing paper feeding operation with high reliability and which requires only a small space and is easy to handle.

The present invention comprises paper feed means including a receptacle disposed in a main frame for receiving a pile of sensitive paper, the paper feed means being adapted for sending out the sensitive paper one sheet after another from the receptacle in response to a predetermined signal or in automatic operation, a charger for electrically charging the sensitive paper, an exposure station including suction means for drawing and temporarily holding the sensitive paper, means for developing the exposed sensitive paper, a dryer for drying the developed paper, guide means comprising a plurality of pairs of rollers and guides disposed along the path of travel of the sensitive paper from the paper feed means to an outlet from which the dried paper is sent out, the machine of the present invention further comprising below-mentioned means disposed above the foregoing means, namely, a film insert frame for placing a microfilm at a predetermined position, a light source located above the film insert frame and equipped with suitable cooling means, a group of at least five interchangeable lenses each having a different magnification and selectively interchangeably provided below the film insert frame, operating means for interchanging the lenses and focusing from outside of the main frame, a mirror adapted to be moved relative to the interchangeable lens selected, an optical system including the mirror and adapted for projecting the image of the original on a screen in a reader section, another optical system fixedly positioned in opposing relationship with the selected interchangeable lens and adapted for projecting the image of the original which has passed through the lens onto the exposure station, a heat release duct for releasing the heat of the light source from the main frame by way of the dryer and electric circuits including an auto-setting circuit for actuating the foregoing respective means in orderly sequence.

In accordance with this invention, a lens interchanging mechanism comprises a slide plate carrying at least five interchangeable lenses which have different magnifications and are adapted for focusing and gears to be rotated through drive means such as belt and pulleys by an operating member provided externally of the main frame, the slide plate being adapted to be moved back and forth in a horizontal direction by an operating lever extending outward from the main frame and to be placed in position under the action of a click stop for holding the selected lens in a predetermined position, the gears being adapted for meshing engagement with rotary focusing gears mounted on the mounts of the interchangeable lenses so that one of the gears meshes with the focusing gear of the interchangeable lens which is selected and held in position.

The paper feed means comprises a receptacle mounted on guide rails in the main frame for receiving a pile of sensitive paper, opposite side plates and rear plate adjustably disposed on the receptacle in conformity with the size of the sensitive paper, arresting arms for holding the front end of the pile of sensitive paper each pivotally supported on each side plate at its one end and provided at its free end with a nail to be brought into engagement with the upper face on each side of the front end of the paper pile, a roller shaft carrying frictional rollers to be rested on the upper face of pile of sensitive paper for sending out the paper and extending through an irregular opening formed at the free end of the arresting arm, roller shaft support arms each pivotally mounted on a bent portion of the receptacle at one end and rotatably carrying the roller shaft at its free end, and transmission means for transmitting to the roller shaft the torque of the pivot of the support arms which is delivered from a main motor by way of a clutch whose operation is electrically controlled, the paper feed means being adapted to be taken out of the main frame.

In accordance with the present invention, several kinds of film and sensitive papers both varying in size can be used in desired combination. The machine enables the operator to conduct copying operation while watching a clear image of the original under a relatively bright light source. Thus, the present machine insures much wider range of application than conventional reader-printer. Since the blast for releasing the heat of the light source is discharge from the machine by way of the dryer, a clear image is obtained on a dry copy from the start while it is possible to reduce the power consumption upon energization of the heater.

Furthermore, the lenses can be interchanged with extreme ease, focusing can be achieved with only one operating member, the paper feed means is capable of sending out the sensitive paper one sheet after another in reliable operation and requires only a minimum space. Since the arresting arms for holding the front end of the sensitive paper and the roller shaft support arms are associated with each other in such relation that the roller shaft extends through the irregular openings at the free ends of the arresting arms, the two arms can be brought to an upright position in one step of handling operation when the paper feed means is taken out of the main frame, supply of the sensitive paper thus being carried out with great ease.

DESCRIPTION OF THE PREFERRED EMBODIMENT

Figure 1:
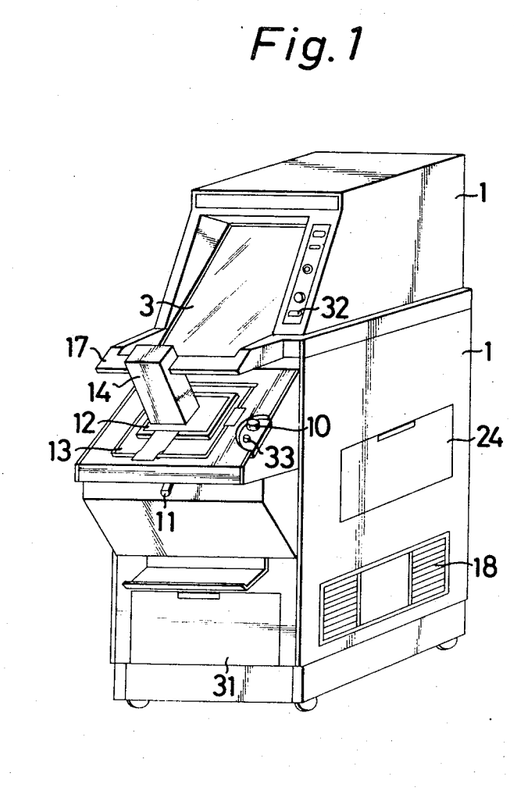
FIG. 1 is a perspective view showing an embodiment of the reader-printer for electrographs in accordance with the present invention.
Figure 2:
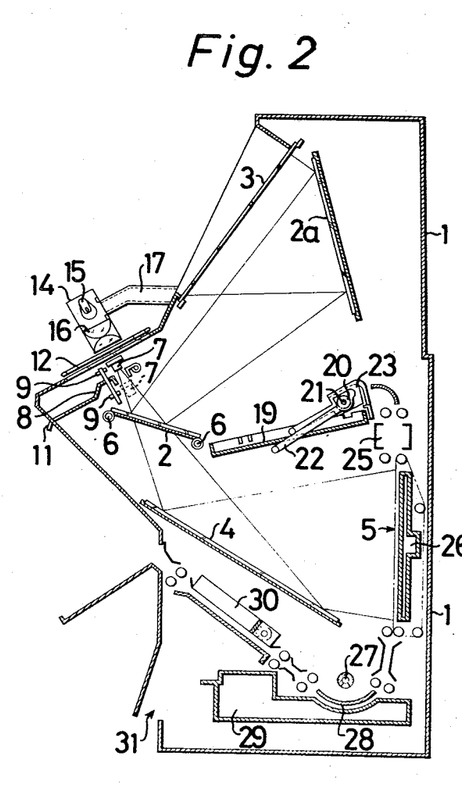
FIG. 2 is a side elevation in section showing the arrangement in the interior of the machine.

Referring to FIGS. 1 and 2, indicated at 1 is a reader-printer for electrographs and at 2 and 2a are mirrors for projecting images of the original recorded on a film onto a screen 3 in a reader section. As already known, the screen 3 is made of a semitransparent material such as frosted glass. Since there is a need to retract the mirror 2 from the light path of an optical system for exposure when the sensitive paper is exposed, the mirror 2 is adapted for leftward and rightward movement on two rails 6 under electrical control. The rails 6 are mounted on a support plate (not shown). The other mirrors 2a and 4 are fixed in position.

As will be described later, a group of interchangeable lenses 7 are aligned and supported on a slide plate 8 and adapted to be moved therewith depending on the magnification of copying and to be stopped at a predetermined position as by a click stop. When the interchangeable lens thus selected is located at the predetermined position, a rotary gear provided on the lens mount is in meshing engagement with either one of two gears 9 mounted on the same shaft, and the lens is focused by rotating the gear 9 with a focusing dial 10. The slide plate 8 can be moved leftward and rightward by a manual lever 11.

A film insert frame 12 on a support 13 is adapted to be moved manually up and down and leftward and rightward within a limited range and designed to accommodate an attachment to be selected depending upon the type of the film used such as, for example, microfiche, roll film, film jacket or the like.

A light source section 14 includes a light source 15 and condenser lenses 16 and is provided with a duct for releasing the heat of the light source which extends through the frame to a vent 18 by way of a dryer.

Disposed approximately at the center of the main frame is a receptacle 19 for receiving a pile of sensitive paper. Pivotally mounted on the opposite sides of the receptacle 19 are a pair of support arms 22 and another pair of arms for arresting the front end of the sensitive paper, the arms 22 carrying a roller shaft 21 equipped with a pair of rubber rollers 20 for feeding the sensitive paper, the roller shaft 21 being adapted to be driven as will be described later. Thus, paper feed means for sending out the sensitive paper is provided. The roller shaft 21 is driven only when the paper is sent out. The paper receptacle 19 carries thereon left, right and rear side plates which can be shifted depending on the size of the sensitive paper. When desired, the whole paper feed means can be taken out of the main frame through an outlet.

Further ahead of the paper feed means, the main frame includes in its lower portion a charger 25 for charging the sensitive paper, suction means 26 serving as exposure station for retaining the sensitive paper in position by suction during exposure, developing means 29 equipped with a drain pipe 27 for discharging a developer liquid and an electrode plate 28 disposed in opposing relationship with the pipe 27, and a dryer 30 incorporating a heater. To effect a continuous operation, a group of rollers for feeding the sensitive paper to be driven by a main motor and guide plates are positioned between these constituent elements and the operation of each element is controlled by electric circuits to be described later. The developing means 29 including the drain pipe 27 and the electrode plate 28 can be taken out of an outlet 31 in the main frame when so desired. In FIG. 1 indicated at 32 is a main switch and at 33 a start switch for energizing the electric circuits to be described later.

Figure 3:
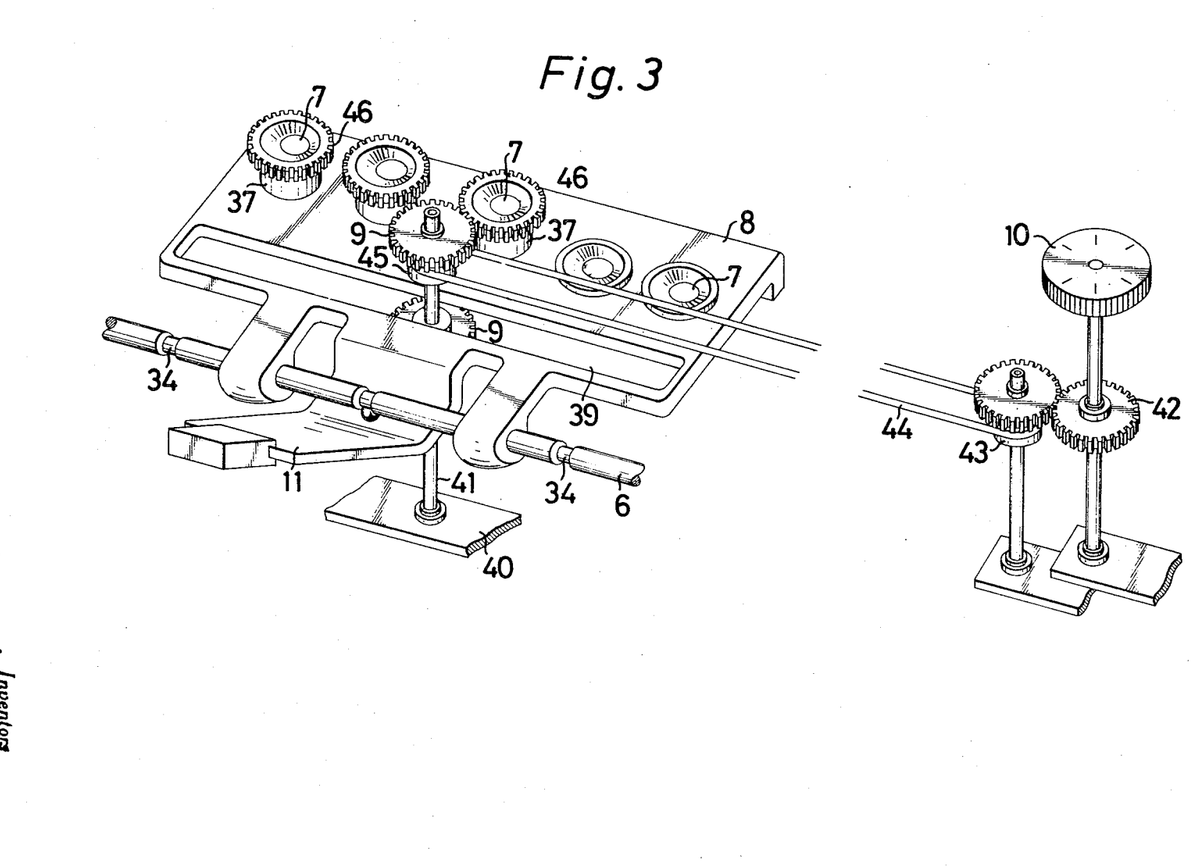
FIG. 3 is a perspective view showing the principal parts of a lens interchanging mechanism.
Figure 4:
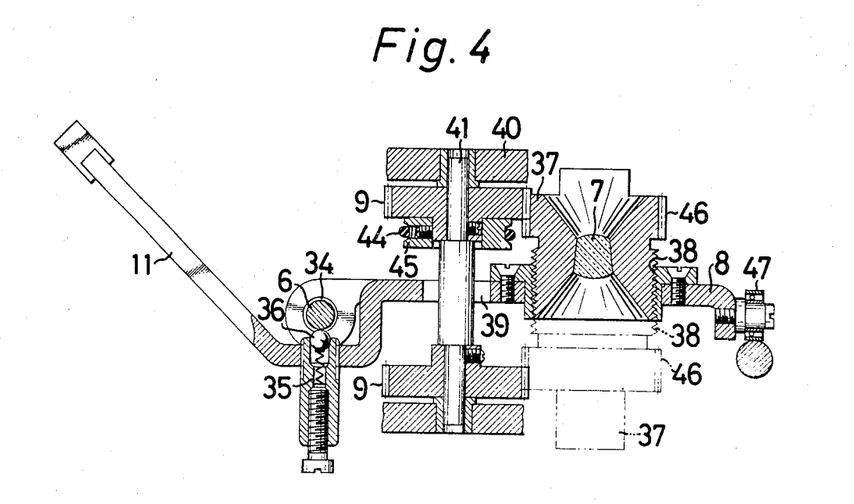
FIG. 4 is a side elevation in vertical section of the same.
Figure 5:
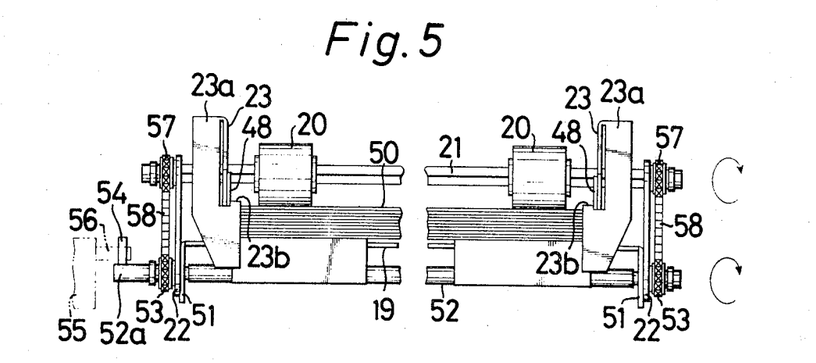
FIG. 5 is a front view with part broken away showing paper feed means during operation.
Figure 6:
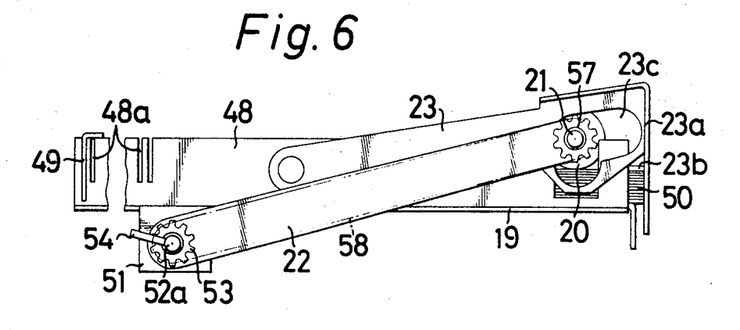
FIG. 6 is a side elevation with part broken away showing the same.

As shown in FIGS. 3 and 4, two rails 6 and 6' are horizontally disposed with the opposite ends thereof secured to brackets in the main frame. A lens interchanging mechanism includes a slide plate 8 slidably mounted on the rail 6 and having a hand lever 11 whose operating portion is exposed from the main frame. The hand lever 11 enables the operator to move the slide plate 8 leftward and rightward.

At several portions in the rail 6 annular grooves 34 are formed, while a ball 36 retained at a suitable portion on the manual lever 11 is held in resilient contact with the rail 6, the ball 36 being adapted to engage the annular grooves 34 to provide a click stop and thereby determine the positions of the interchangeable lenses 7.

At least five interchangeable lenses different in magnification are mounted on the slide plate 8 utilizing the helicoids 38 of the lens mounts 37, and by rotating the lens mounts 37 the interchangeable lenses are moved up and down for focusing.

The slide plate 8 is formed with a slot 39 parallel with the rail 6 and passing through the slot 39 is a vertical shaft 41 whose upper and lower ends are rotatably supported on the main frame 1 at suitable portions 40 thereof. The vertical shaft 41 is provided with a pulley 45 fixedly mounted thereon and adapted to be driven by the focusing dial 10 by way of a gear 42, pulley 43 and belt 44. Also mounted on the shaft 41 are two gears 9 which are rotated together with the pulley 45 and adapted for meshing engagement with gears 46 mounted on the lens mounts 37 of the interchangeable lenses 7, the arrangement being such that one of the gears 9 is brought into meshing engagement with the gear 37 on the lens mount 37 of the interchangeable lens which is selected at the position defined by the click stop. At the distal end of the slide plate 8 there is mounted a roller bearing 47, which is seated on the other rail 6'.

Thus, when a lens of a desired magnification is selected from among the group of interchangeable lenses 7, the lens is rotated by operating the dial 10 and thereby moved up and down, focusing thus being readily achieved. The foregoing structure wherein the roller bearing 47 mounted at the distal end of the slide plate 8 is supported on the rail 6' enables the slide plate 8 to move back and forth in horizontal direction even where the two rails are not exactly in parallel, hence the arrangement is advantageous in that machining need not be carried out with a very high accuracy. However, the structure need not be limited only to the mode of the above embodiment.

In the illustrated embodiment, the gears 9 are disposed above and below the slide plate 8 respectively, the upper gear 9 being adapted for meshing engagement with the gears 46 of lens mounts 37 of the interchangeable lenses projecting upwardly of the slide plate 8, the lower gear 9 being adapted for meshing engagement with the gears 46 of lens mounts 37 of the downwardly projecting lenses. In the case where the lens mounts 37 are all disposed above the slide plate 8 with the gears thereof 46 positioned substantially at the same level, only one gear 9 may be provided, while if the gears are positioned at markedly different levels, a desired number of gears 9 may be mounted for engagement with the respective gears 46.

The paper feed means illustrated in detail in FIGS. 5 to 8 includes the receptacle 19 for receiving a pile of sensitive paper and a frame mounted on the receptacle 19. The receptacle is carried on an unillustrated guide to be drawn out of the machine. The frame comprises a pair of guide plates 48 on the opposite sides adjustably mounted depending upon the size of the sensitive paper and a rear guide plate 49 in engagement with one of a suitable number of cutout grooves 48a formed in each of the side guide plates 48, the position for the guide plate 49 to engage the side guide plates 48 thus being adjustable. The sensitive paper 50 is piled within the frame. A pair of downwardly bent portions 51 at the opposite ends of the receptacle 19 rotatably supports a drive shaft 52 positioned in parallel with the plane of the receptacle 19 for receiving the paper. The drive shaft 52 loosely supports, at its opposite ends, the base portions of a pair of support arms 22, with sprockets 53 further mounted on the shaft 52 externally of the arms 22. Implanted in an extension 52a at the left end of the drive shaft 52 is a driven member 54 which is held in engagement with a drive portion 56 implanted in a drive member 55 to be driven in the direction of an arrow in FIG. 5 by a motor (not shown). Thus the drive shaft 52 is adapted for rotation.

The free ends of a pair of the support arms 22 support a roller shaft 21 whose opposite ends carry sprockets 57 in opposite relationship with the sprockets 53 on the drive shaft 52. A chain 58 is reeved around the sprockets 53 and 57 at either side to drive the roller shaft 21. The chain 58 may be mounted only at one side of the receptacle 19 for the transmission of torque, but the provision of the chains on both sides serves to deliver a force uniformly on both sides during paper feeding operation, thus preventing the sensitive paper from being sent out in inclined position.

Figure 8:
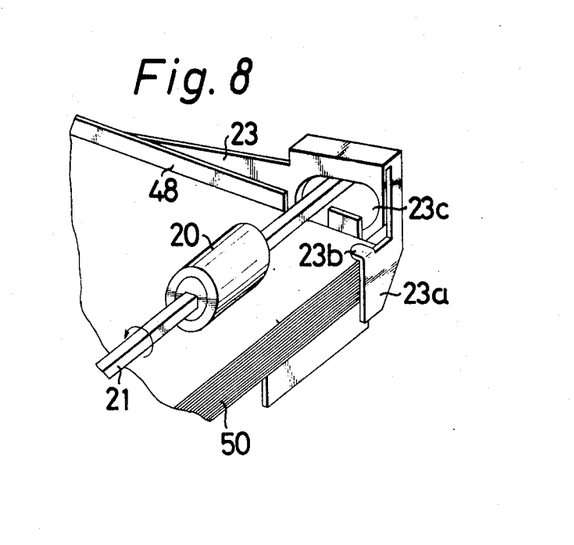
FIG. 8 is a perspective view showing the principal parts for sending out sensitive paper.

The roller shaft 21 carries a pair of rollers 20 covered with a material such as rubber which causes great friction and adapted to be moved slidably in the axial direction. By adjusting the positions of the rollers 20 in suitable relationship with the opposite side guide plates 48, the rollers 20, due to the gravity, come into pressing contact with the front margin of the uppermost sheet of the sensitive paper 50 at suitable positions on the left and right as seen in FIG. 8 and, by the torque of the rollers 20, the uppermost sheet of the paper 50 can be sent out one after another. In order to prevent idle rotation of the rollers 20, the roller shaft 21 is in the form of a square rod, or suitable means such as spline shaft, engagement of key with key way or the like may be used.

A pair of arms 23 for arresting the front end of the sensitive paper are pivotally mounted, at their base portions, on the opposite side guide plates 48. Each of the arresting arms 23 has a bent portion 23a for engaging the front end of the pile of paper 50 and a nail 23b extending from the bent portion 23a for holding the margin of the paper 50 from above on each side by the gravity of the arm 23.

Figure 7:
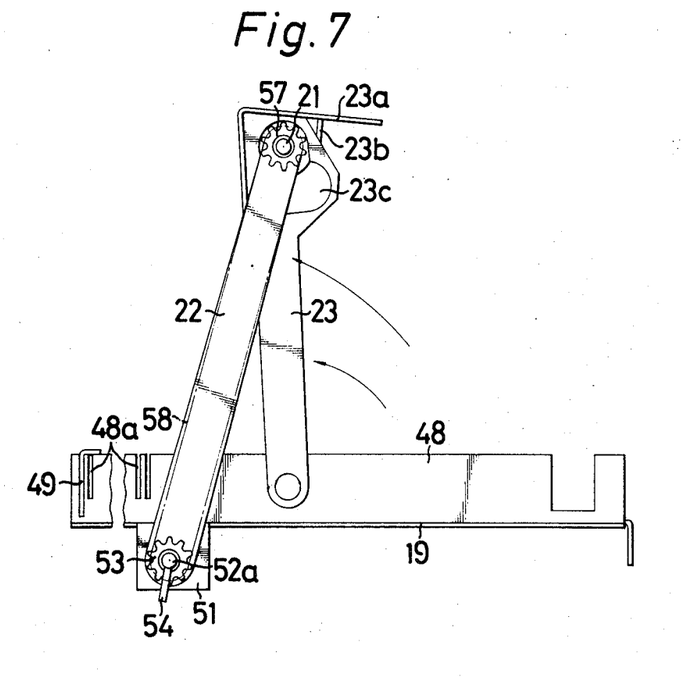
FIG. 7 is a front view with part broken away showing the paper feed means when sensitive paper is supplied thereto.

When the uppermost sheet of the sensitive paper 50 is sent out by the rubber rollers 20, the nails 23b act to retain the underlying sheets and prevent them from being sent out along with the uppermost sheet. The arresting arms 23 are further formed with openings 23c of irregular shape so as to leave the roller shaft 21 free of interference during paper feeding operation or during the procedure of supply or change of sensitive paper, the openings 23c thus allowing the rubber rollers 20 to come into contact with the upper face of the pile of paper 50. When the support arms 22 and arresting arms 23 are to be brought to an upright position for the supply or change of the sensitive paper as shown in FIG. 7, the roller shaft 21 can be brought to such position readily because of the provision of the openings 23c. Moreover, the openings 23c, whose inner edges are held in contact with the roller shaft 21 when the main arms 22 and 23 are raised, serve to retain the arms 22 and 23 in the upright position.

Thus, when the rubber rollers 20 are driven in contact with the upper face of the pile of sensitive paper, the paper is sent out one sheet after another. Even if more than one sheet of paper is to be sent out, the uppermost sheet alone which is held in contact with the rubber rollers 20 with a greater frictional force than the underlying sheet(s) will be released off the latter which are retained, because the front end of the paper is arrested by the bent portions 23a of the opposite arresting arms with the upper face of the paper also held by the nails 23b. In this manner, the uppermost sheet is temorarily deformed and released off the underlying paper while still being held by the nails 23b at the front margin and, when the margin is thereafter freed from the nails, the sheet is restored and driven out by the rollers. When the pile of the paper has been consumed or reduced, warning is given by known means.

For the supply of sensitive paper or replacement with paper of a different size, the receptacle 19 is taken out of the main frame through the outlet 24. When the roller shaft 21 is lifted, the support arms 22 and arresting arms 23 are raised simultaneously and upon the roller 21 hitting the inner edge of the opening 15c, both arms are held in the upright position. When sensitive paper is supplied, or when sensitive paper is placed on the receptacle 19 with the side guide plates 48 and the rear guide plate 49 adjusted to the size of the paper, the arms 22 and 23 are lowered to bring the rubber rollers 20 into contact with the upper face of the paper and the receptacle 19 is pushed back into the machine. In this position the drive means performs power transmission through the engagement of the drive portion 56 with the driven member 54 as already described, trouble-free drive power delivery being insured.

Figure 9:
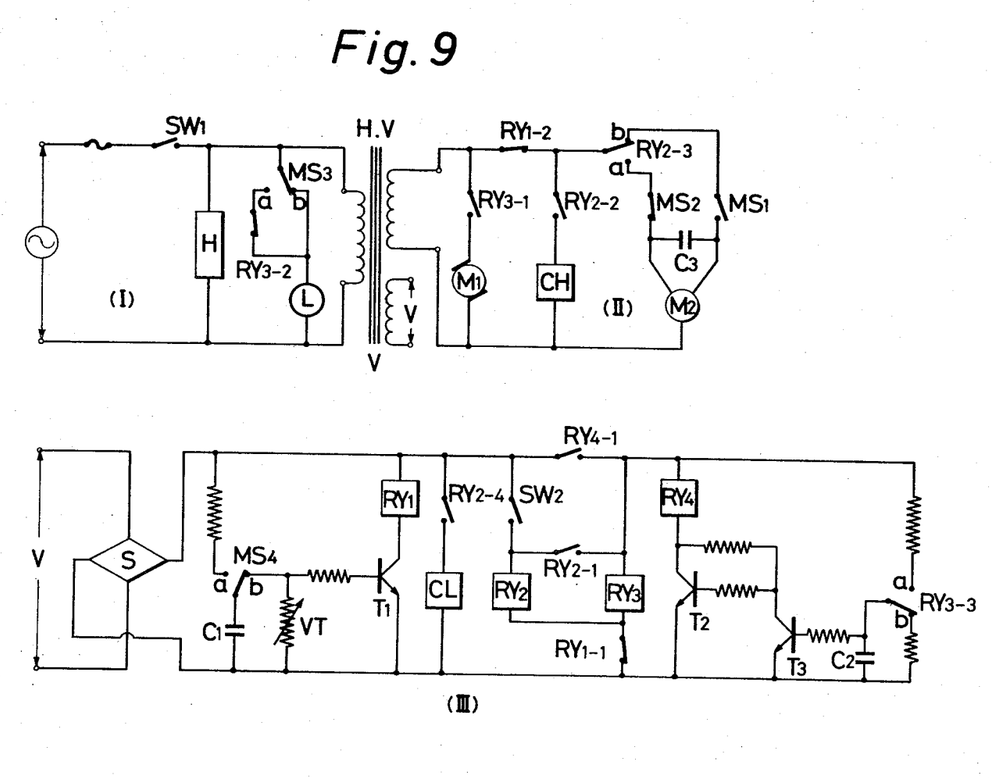
FIG. 9 is a circuit diagram showing an embodiment of the electric circuit for controlling the operation of the constituent means of this invention.

Feed of the sensitive paper, charging, exposure, development and drying are carried out in orderly sequence under the control of electric circuits shown in FIG. 9.

Referring to FIG. 9, $SW_1$ is turned on by operating a main switch 32, whereupon a primary circuit I of the switch $SW_1$ is energized to apply AC voltage to a heater H for heating operation. At the same time a light source L is turned on through a microswitch $MS_3$ whose contact $b$ is in closed position. In this state an original film is inserted into the film insert frame 12 and the image is projected on the screen 3 by means of mirrors 2 and 2a. The focusing dial 10 is operated for focusing and reading.

Further when the switch $SW_1$ is closed, the AC voltage of the power source provides a rated voltage for a secondary circuit II comprising a main motor $M_1$ and a charger CH and supplies a voltage V which is lower than the rated voltage to a tertiary circuit III composed of a start switch $SW_2$ and transistors $T_1, T_2, T_3$, the voltage V having been lowered by a transformer HV. The low AC voltage, input of the tertiary circuit III, is converted into direct current by a rectifying element S for application to the circuit of the transistors $T_1, T_2, T_3$.

Next, when the start switch 33 is depressed to turn on the switch $SW_2$ of the tertiary circuit III, relays $RY_2$, $RY_3$ and $RY_4$ are actuated by way of a contact $RY_{1-1}$ which is already in ON position. When a contact $RY_{3-1}$ is closed by the operation of the relay $RY_3$, the main motor $M_1$ is initiated into rotation. At the same time, a contact $RY_{3-2}$ in the primary circuit is turned off and a change-over contact $RY_{3-3}$ in the tertiary circuit is switched from contact $b$ to contact $a$.

The operation of the relay $RY_2$ brings contacts $RY_{2-1}, RY_{2-2}, RY_{2-4}$ to ON state and switches the changeover contact $RY_{2-3}$ from contact $b$ to contact $a$. Through the contact $RY_{1-2}$ which is already in closed position and the contact $RY_{2-3}$ which is thus closed at contact $a$, a mirror operating motor $M_2$ is initiated into rotation in the positive direction by way of an already closed microswitch contact $MS_2$ so as to retract the movable mirror 2 from the path of light on the rail 6. When the mirror reaches the terminal position of the retraction, the microswitch contact $MS_2$ is opened to bring the motor $M_2$ to a halt. Further upon the initiation of retraction, the mirror 2 switches the microswitch contact $MS_1$ from OFF position to ON position, while at the microswitch $MS_3$ contact $b$ is opened and contact $a$ is closed. At this time, the operation of the relay $RY_3$ keeps the contact $RY_{3-2}$ open and the light source L is therefore turned off. The mirror motor $M_2$, a capacitor motor, is driven in positive direction when current is applied through the microswitch contact $MS_2$, while it is driven in the reverse direction when current is applied through the microswitch $MS_1$.

The operation of the relay $RY_2$ further actuates the charger CH by way of the contact $RY_{2-2}$ and operates a paper feed clutch CL by way of the contact $RY_{2-4}$ to initiate paper feeding operation. By means of the relay $RY_2$, the contact $RY_{2-1}$ is self-sustained. Further due to the operation of the relay $RY_2$, current passes through the contact $RY_{2-1}$ and the relay $RY_4$ closes the contact $RY_{4-1}$ and keeps it self-sustained. Since the contact $RY_{3-3}$ is closed at contact $a$, an auto-resetting circuit composed of the transistors $T_2$ and $T_3$ is maintained an a state of conduction.

When the start switch 33 is relieved from depression, the switch $SW_2$ is immediately turned off, but since the relay $RY_4$ keeps the contact $RY_{4-1}$ self- sustained, the relays $RY_2, RY_3$ and $RY_4$ are still in operation. In order to retain the tertiary circuit III in conduction state so as to keep the paper feeding operation even after the switch $SW_2$ in the circuit III is brought to OFF position, the auto-resetting circuit is provided. While the switch $SW_2$ is not in operation, a capacitor $C_2$ continues to store the voltage supplied from the power source V which voltage is to be applied to the resetting circuit for the initiation of operation thereof. A plurality of resistors included in the circuit serve to retain the voltage on the circuit at a level below the power source voltage V and to apply a very low current to the transistors $T_2$ and $T_3$. When the resetting circuit is actuated and the voltage applied by the capacitor $C_2$ exceeds the voltage of the circuit, the transistor $T_3$ is brought into a state of conduction with the transistor $T_2$ brought to OFF state. Then when the relay $RY_4$ is turned off, the tertiary circuit III is completely brought out of operation.

When the front end of the sensitive paper hits the microswitch $MS_4$ and switches the microswitch from contact $b$ to contact $a$, the capacitor $C_1$ is charged to the level of the voltage of the tertiary circuit. When the paper passes through the microswitch $MS_4$, the switch is again closed at contact $b$ to operate the relay $RY_1$. At this time, the voltage on the capacitor $C_1$ is instantaneously applied to the transistor $T_1$ by a variable resistor VT to close the relay $RY_1$.

When the relay $RY_1$ is closed, the contact $RY_{1-1}$ is turned off and the relays $RY_2$ and $RY_3$ are also turned off. Accordingly, when the contact $RY_{3-1}$ is opened, the main motor $M_1$ is stopped. Thus the sensitive paper is stopped while being attracted to the suction means 26. Further when the contact $RY_{2-2}$ is opened, the charger CH is unenergized, while the eopening of the contact $RY_{2-4}$ moves the paper feeding clutch CL out of operation. Further the contact $RY_{2-1}$ is opened and the contact $RY_{2-3}$ is closed at contact $b$. The contact $RY_{3-3}$ now closed at contact $b$ discharges the capacitor $C_2$. Although the contact $RY_{2-3}$ is brought to closed state at contact $b$ and the microswitch $MS_1$ is closed, the mirror operating motor $M_2$ will not be actuated since the contact $RY_{1-2}$ is open.

On the other hand, when the relay $RY_3$ is brought out of operation, the contact $RY_{3-2}$ is closed, with the result that through the microswitch $MS_3$ which is closed at contact $a$ the light source L is turned on to make an exposure on the sensitive paper retained at the exposure station 5.

The suction force of the suction means 26 is generated by an unillustrated suction motor upon turning on the main switch and while the main switch is closed, a suitable suction force is maintained. The suction motor is generally connected to the circuit of the main motor $M_1$ and the contact $RY_{3-1}$ in parallel therewith.

At the time when exposure has been completed, the voltage on the capacitor $C_1$ is lower than the voltage on the tertiary circuit III due to discharging. Accordingly, the transistor $T_1$ is brought into OFF state with the relay $RY_1$ also turned off. As a result, the contacts $RY_{1-1}$, $RY_{1-2}$ and relay $RY_3$ are closed again. therefore, the contact $RY_{3-1}$ is closed, contact $RY_{3-2}$ is opened, and the contact $RY_{3-3}$ is closed at contact $a$. The main motor $M_1$ is now actuated into operation to drive the exposed paper toward the developing means 29. With the contact $RY_{1-2}$ on, the mirror operating motor $M_2$ is driven in the reverse direction to bring the mirror 2 back to the original position. Simultaneously with the turning off of the contact $RY_{3-2}$, the light source L is turned off. Further when completely returned to the original position, the mirror 2 turns off the microswitch contact $MS_1$ and turns on the microswitch contact $MS_2$ so as to halt the mirror operating motor $M_2$. The microswitch $MS_3$ is closed at contact $b$ to turn on the light source L again. Thus, the system is brought back to the original state before the start switch $SW_2$ is turned on. The developed sensitive paper is dried by the dryer 30 and then sent out of the machine.

In the foregoing operation, the auto-resetting circuit need not be in operation at the time when the relay $RY_1$ is on, so that when the $RY_{3-3}$ is closed again at contact $b$ and the capacitor $C_2$ is discharged, the circuit is temporarily unenergized. The contact $RY_{3-3}$ serves as a contact of the circuit for charging and discharging the capacitor $C_2$ and adapted to be operated in synchronization with turning on and off of the relay $RY_3$. The contact $RY_{3-3}$ thus functions to effect proper charging and discharging of the capacitor $C_2$.

When the developed copy is sent out of the machine, the start switch is turned on again to repeat the foregoing operation. When the main switch $SW_1$ is turned off, all the circuits are brought out of operation and the contacts are returned to the positions shown in FIG. 9.

In the embodiment shown in FIG. 9, the heater H is adapted to be operated upon turning on the main switch and kept in operation at a constant voltage until the main switch is turned off. The heater may alternatively be so adapted as to be operated at a required current only when desired as seen in FIG. 10 and to be kept in warmed-up state by a lower current when it is not performing drying operation so as to reduce power consumption.

Figure 10:
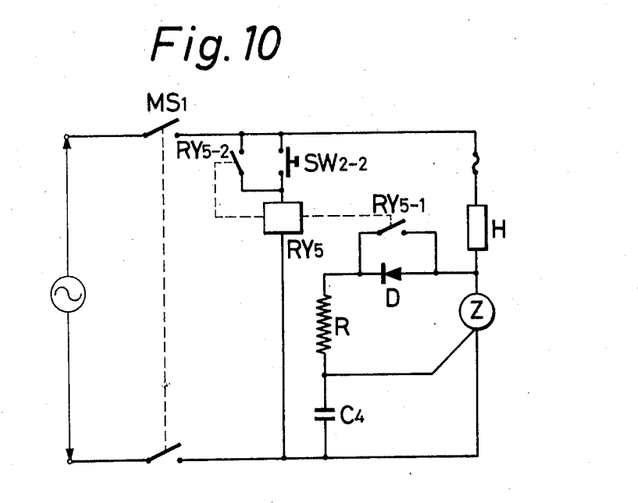
FIG. 10 is a view showing an embodiment of the circuit for controlling a heater.

Referring to FIG. 10, the circuit of heater is connected to an AC power source through a main switch $MS_1$ and a triac Z is connected in series with the heater H. The circuit further includes a diode D and a contact $RY_{5-1}$ connected in parallel with the diode, one terminal of the diode being connected to the gate of the triac Z, the other terminal thereof being connected to the junction of the heater H and the triac Z. The contact $RY_{5-1}$ is operated by a timing relay $RY_5$ which is connected to the power source through a switch $SW_{2-2}$ to be closed upon turning on the start switch for feeding sensitive paper.

More specifically, when the main switch $SW_1$ is closed, the half sine-wave passing through the diode D serves as the gate signal for the triac Z and a current in the form of half sine-wave passes through the heater H to preheat the heater, thus keeping the heater generating heat which is much smaller than that produced by the heater in full operation.

When the start switch contact $SW_{2-2}$ is closed upon initiation of travel of the paper, the timing relay $RY_5$ is energized to close the contact $RY_{5-1}$ and apply sinewave current of a predetermined voltage to the heater in spite of the presence of the diode D. As a result, heater produces heat of a predetermined temperature. When the sensitive paper has passed through the heater section, namely through the dryer, the time set by the relay $RY_5$ elapses, whereupon the contact $RY_{5-1}$ is opened, with the result that the temperature of the heater H drops to a temperature level for preheating. A contact $RY_{5-2}$, a self-sustaining contact for the timing relay $RY_5$, enables the relay $RY_5$ to keep operating even when the switch $SW_{2-2}$ opens upon depression. Upon lapse of the time set by the relay $RY_5$, the contact $RY_{5-2}$ also opens.

In this manner, it has been made prevent to reduce power consumption of the heater H and prevent overheating in the machine, a blower for cooling, for instance, thus being dispensed with.

We claim:

1. A reader-printer for electrographs comprising paper feed means including a receptacle disposed in a main frame for receiving a pile of sensitive paper and for dispensing the sensitive paper one sheet after another from said receptacle, a charger for electrically charging the sensitive paper, an exposure station including suction means, means for developing exposed sensitive paper, a dryer for drying developed sensitive paper, guide means including a plurality of pairs of rollers and guides for leading the sensitive paper from said paper feed means into above-mentioned respective means and sending out the paper from an outlet; said reader-printer further comprising the below-mentioned means, disposed above the above-mentioned means: a film insert frame for placing a microfilm at a predetermined position, a light source located above said film insert frame and equipped with cooling means, a group of interchangeable lenses disposed below said film insert frame, a mirror movable relative to said group of interchangeable lenses, means including an optical system, including said mirror for projecting the image of the original on a screen in a reader section, and means including another optical system positioned in opposing relationship with said group of interchangeable lenses, for projecting the image of the original on said exposure station, the above-mentioned respective means including said light source being controlled by means including an auto-resetting circuit for returning said respective means to their normal state following a printing cycle.

2. The reader-printer as set forth in claim 1 wherein said auto-resetting circuit comprises a capacitor ($C_2$) for continuously storing a voltage for energizing said resetting circuit while a switch ($SW_2$) of a tertiary circuit is out of operation so as to keep the tertiary circuit energized even after the switch ($SW_2$) is opened and a plurality of resistors for keeping the circuit voltage lower than the power source voltage and applying a very low current to transistors ($T_2$) and ($T_3$), whereby a relay ($RY_4$) is turned off after the transistor ($T_3$) is turned on and transistor ($T_2$) is turned off by a voltage impressed by said capacitor ($C_2$) and exceeding the circuit voltage.

3. The reader printer as set forth in claim 1 wherein said interchangeable lenses are of different focal lengths and comprising externally operable means for selecting and focussing said interchangeable lenses.

4. A reader-printer for electrographs comprising paper feed means including a receptacle disposed in a main frame for receiving a pile of sensitive paper and for dispensing said sensitive paper one sheet after another from said receptacle, a charger for electrically charging the sensitive paper, an exposure station including suction means, means for developing exposed sensitive paper, a dryer for drying developed sensitive paper, guide means including a plurality of pairs of rollers and guides for leading the sensitive paper from said paper feed means into the above-mentioned respective means and sending out the paper from an outlet; said reader-printer further comprising the below-mentioned means, disposed above the above-mentioned means: a film insert frame for placing a microfilm at a predetermined position, a light source located above said film insert frame and equipped with cooling means, a group of interchangeable lenses disposed below said film insert frame, a mirror adapted to be moved relative to said group of interchangeable lenses, means comprising an optical system including said mirror and for projecting the image of the original on a screen in a reader section, and means including another optical system positioned in opposing relationship with said group of interchangeable lenses for projecting the image of the original on said exposure station; said reader-printer further comprising a lens interchanging mechanism composed of a slide plate carrying in a focus-adjustable manner at least five interchangeable lenses having different magnifications and at least one gear rotatable through drive means including belt and pulleys by a focusing member provided externally of said main frame, said slide plate being movable back and forth in a horizontal direction by an operating lever extending outward from said main frame and holding the selected lens in a predetermined position, said gear being engageable with rotary focusing gears mounted on the mounts of said interchangeable lenses so that said gear meshes with the focusing gear of said interchangeable lens which is selected and held in position.

5. A reader-printer for electrographs comprising paper feed means including a receptable disposed in a main frame for receiving a pile of sensitive paper for dispensing said sensitive paper one sheet after another from said receptable, a charger for electrically charging the sensitive paper, an exposure station including suction means, means for developing exposed sensitive paper, a dryer for drying developed sensitive paper, guide means including a plurality of pairs of rollers and guides for leading the sensitive paper from said paper feed means into above-mentioned respective means and sending out the paper from an outlet; said reader-printer further comprising below-mentioned means, disposed above the above-mentioned means: a film insert frame for placing a microfilm at a predetermined position, a light source located above said film insert frame and equipped with cooling means, a group of interchangeable lenses disposed below said film insert frame, a mirror movable relative to said group of interchangeable lenses, means comprising an optical system including said mirror for projecting the image of the original on a screen in a reader section, and means including another optical system positioned in opposing relationship with said group of interchangeable lenses for projecting the image of the original on said exposure station, said paper feed means being composed of a receptacle moun ted on guide rails in said main frame for receiving a pile of sensitive paper, opposite side plates and rear plate adjustably disposed on said receptacle in conformity with the size of the sensitive paper, arresting arms for holding the front end of the pile of sensitive paper each pivotally supported on each side plate at its one end and provided at its free end with a finger engageable with the upper face on each side of the front end of the paper pile, a roller shaft carrying frictional rollers engageable with the upper face of pile of the sensitive paper for sending out the paper and extending through an irregular opening formed at the free end of said arresting arm, support arms each pivotally mounted on said receptacle at one end and rotatably carrying said roller shaft at its free end, and transmission means for transmitting to said roller shaft the torque of said support arms which is delivered from a main motor by way of a clutch whose operation is electrically controlled, said paper means being removable from said main frame.

* * * * *